United States Patent [19]

Massoni et al.

[11] 4,357,558
[45] Nov. 2, 1982

[54] AUTOMATIC CONTROL DEVICE FOR LIGHTING AND EXTINCTION OF HEADLAMPS IN A VEHICLE

[76] Inventors: François Massoni, 95, avenue de la Lanterne, 06200 Nice, France; Filippe Canarelli, 24 via Garibaldi, Vintimille, Italy; Françoise Fellrath, 4, avenue Primerose, 06200 Nice, France

[21] Appl. No.: 204,141

[22] Filed: Nov. 5, 1980

[30] Foreign Application Priority Data

Nov. 7, 1979 [FR] France .............................. 79 27461
Oct. 23, 1980 [FR] France .............................. 80 22699

[51] Int. Cl.³ ............................................... B60Q 1/02
[52] U.S. Cl. .................................... 315/83; 315/77; 315/153; 315/155; 315/322
[58] Field of Search ............ 315/77, 82, 83, 152–155, 315/159, 317, 322, 362; 250/214 AL; 307/10 LS

[56] References Cited

U.S. PATENT DOCUMENTS 2,825,851  3/1958  Lidiak ................................. 315/83
2,965,798  12/1960  Cade ................................... 315/83
3,319,116  5/1967  Schick ............................ 315/154 X
3,828,220  8/1974  Moore et al. ................... 315/152 X Primary Examiner—Eugene R. La Roche
Attorney, Agent, or Firm—Karl W. Flocks; Sheridan Neimark

[57] ABSTRACT

An automatic control device for the lighting and extinction of headlamps of car, comprising at least two photosensitive elements connected to control circuits defining luminosity thresholds to produce control signals depending on ambient luminosity, and a logic control circuit receiving said control signals to control the three levels of headlamps of the vehicle.

Said logic control circuit comprises further photo-sensitive elements connected to further control circuit means and input and output means to receive and produce control signals respectively. The automatic control system selectively provides automatic operation or manual operation or semi-manual operation. It is associated with a system for monitoring reflected light to eliminate influence of extraneous light reflections from obstacles as the vehicle moves on the road.

The combination of the automatic control system for lighting and extinguishing headlamps with the reflected light monitoring system permits significant improvement of the driving safety, resulting from the automatic functioning of the vehicle lamps.

10 Claims, 5 Drawing Figures

AUTOMATIC CONTROL DEVICE FOR LIGHTING AND EXTINCTION OF HEADLAMPS IN A VEHICLE The invention relates to an automatic control device or system for lighting and extinction of headlamps in a vehicle.

Such a device is intended for permitting automatic transition from one condition of the vehicle lighting system to the other as a function of luminosity circumstances. In an automotive vehicle, for example, it permits automatic switching to a condition wherein all headlamps are extinguished or to conditions in which the side marker lights, the lower passing beam or the upper beam lamps are lighted, respectively, without requiring any operation from the driver.

Furthermore, such a device is actuated as soon as the ignition key of the vehicle is turned on.

An electronic automatic control headlamps-lower beam selector is described in French Pat. No. 75 16557, but such a selector presents many disadvantages. One of the drawbacks of the known selector results from the fact that its operation is not totally automatic. As a matter of fact, said selector only controls the switching from headlamps to lower passing beam lamps and vice-versa, but the driver must first manually pass from the side marker light position and then to the lower beam lamp position ("upon utilization in the automatic control mode the normal switch will be left in the lower beam position"), and thereafter, actuate the manual-automatic reversing switch. There is a serious disadvantage in case the driver should forget to switch off the device since the headlamps being continuously switched on the battery would risk being rendered unusable, as the switching on or off is not automatic.

The device according to the invention permits complete elimination of any manual intervention on the part of the driver, since actuation of the lamps is totally automatic and functions as soon as the engine of the vehicle has been started.

To prevent the vehicle battery being too largely sollicited as the vehicle is moving off, provision is made to prevent lighting of the lower and upper beams for the period of time necessary for starting the vehicle.

Moreover, the totally manual control may always be used for example, in case of failure in the automatic device, such manual control being connected in parallel relation to the automatic control and having priority over the latter.

According to the invention, said device can also function in a third, half-manual, mode wherein, when the manual control switch is in the position corresponding to the lower or upper beam lamps, with the manual control being in the switch off position, the lower or upper beams are lighted on condition that luminosity is sufficiently low to initiate automatic lighting of the side marker lights.

The automatic device comprises at least three photosensitive units for example, photo-electric cells connected to three control circuits, themselves connected to three relays through a logic control circuit. Such relays are respectively associated with a contact connecting the side marker lamps, and the lower or the upper beam lamps to the vehicle storage battery when luminosity is lower than a predetermined value which is different for each of them. The logic control circuit must transmit signals from the control circuits to the relays, on the one hand, and on the other hand, prevent simultaneous lighting of the lower and upper beam lamps, and also take into account the manual control priority.

To avoid repeated switchings due to slow variations in luminosity when the latter is close to a value for which a switching on must be effected, it is provided according to the invention to replace such a single value by two thresholds. Thus, the lamps come on when the luminosity is lower than a first threshold and go out when luminosity increases above a second threshold higher than the first. Of course, the thresholds are different for the side marker lamps, the lower and the upper beam lamps.

To prevent the automatic device having deficient functioning when running into extraneous light sources, such for example, lighted windows or reflective surfaces such as white walls, protective rails in the curves, retro-reflectors, panels in form of reflectors and the like, under which conditions it would have the tendency to respond to light intensities received by instantaneous transitions from upper to lower beams, and vice-versa, thereby causing untimely flashing embarrassing the driver, the automatic headlamp control circuit is combined with a reflected light monitoring system, comprising a radiation transmitter preferably producing invisible, such as infra-red, radiations, which are modulated both in frequency and amplitude, and a receiver only responsive to the transmitter radiations reflected from obstacles encountered as the vehicle moves on.

The receiver is designed to supply a signal for example a voltage which is a function of the quantity of reflected radiations and is applied through a resistance-diode input to the automatic control device to vary as long as possible the reference voltage in the comparator determining the lighting and extinction threshold for the headlamps.

Due to such reflected light monitoring system, the untimely upper-lower beam flashing phenomenon resulting from reflection of light generated by the vehicle's own headlamps, and interpreted by the photosensitive means as being lights from a vehicle moving in the reverse direction, is totally eliminated.

The invention will be described with more detail with reference to the attached drawings which represent a possible, not limitative, exemplifying form of embodiment of the invention.

Figure 5:
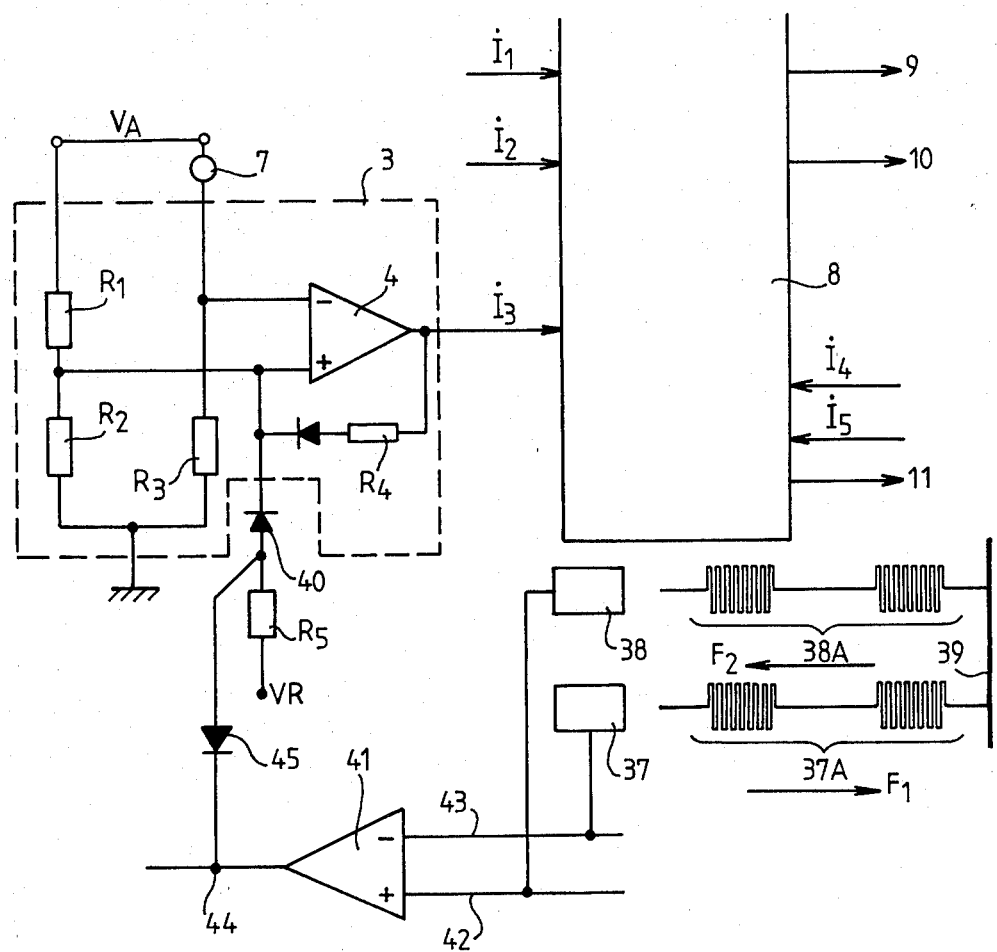

and, FIG. 5 is a diagram on a larger scale showing the upper beam lamp control circuit which is provided with a reflective light monitoring device to enable total elimination of any instantaneous untimely lower to upper beam transition and vice-versa.

Figure 1:
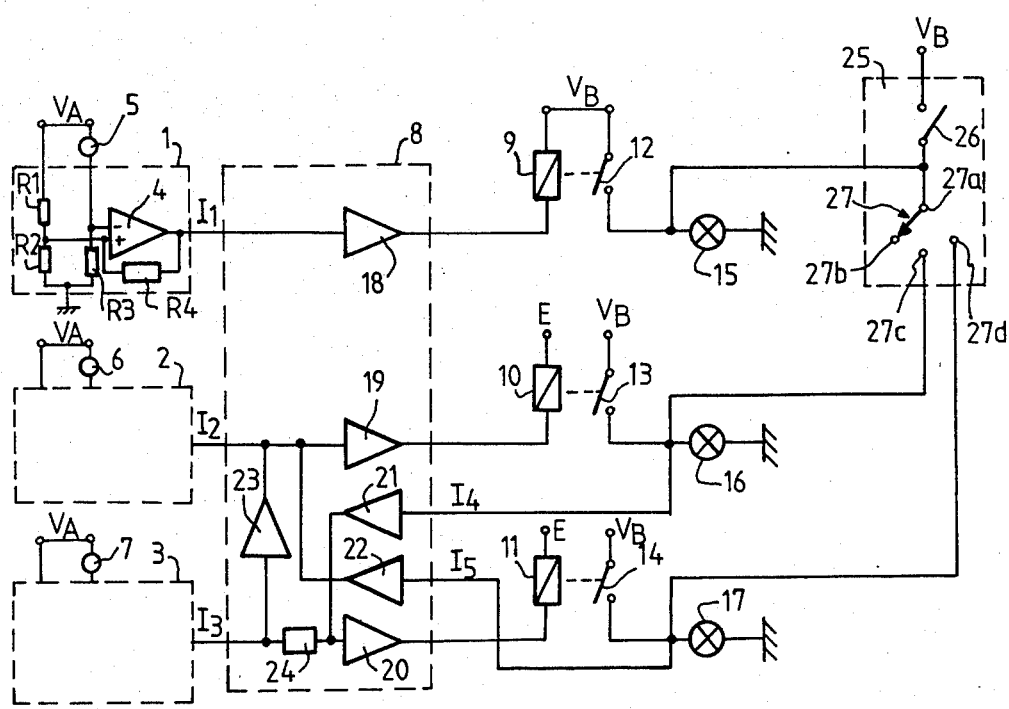
FIG. 1 represents schematically the automatic device according to the invention.

Referring to FIG. 1, the device according to the invention comprises three control circuits 1,2 and 3, intended to control the lighting of the side marker lamps, the upper and lower beam lamps, respectively. Said three circuits are identical and only circuit 1 is shown in detail on FIG. 1. As will be seen with more detail hereinbelow, circuit 3 is shown on a larger scale on FIG. 5.

Each of the control circuits mainly comprises an operational amplifier 4 having a high input impedance, the output of which constitutes the output of the control circuit. The high input impedance to the control circuits, in combination with special photo-electric cells having a very fast response time even when luminosity is low, and a high residual resistance in darkness, permits correct operation of the device without any lense for concentration or focussing of the light.

The non reversing input to the operational amplifier 4 is connected to the supply voltage $V_A$ through a resistance R1, on the one hand, and on the other hand, to the ground through a resistance R2. Its reversing input is connected to the ground through a resistance R3 and the supply voltage $V_A$ through a photo-electric cell or any analogous device 5, for the circuit 1,6 and 7, respectively, circuits 2 and 3. Thus, the operational amplifier 4 of each of the control circuits compares the voltage supplied to its reversing input which is a function of the luminosity to a reference voltage applied to its non reversing input. Such circuit is the usual comparator circuit having an output voltage that can take two different logic values. A resistance R4 connects the non reversing input to the operational amplifier 4 to the output thereof. In this way, the reference voltage applied to the non reversing input takes two different values according to the amplitude of the output voltage from the operational amplifier 4.

Thus, when the photo-electric cell is sufficiently illuminated and the corresponding lamps should not be lighted, the output from the corresponding control circuit is at a low level or level "0" close to the ground.

The reference voltage applied to the non reversing input is then determined by the voltage divider consisting of resistance R1 and resistance R2 to which resistance R4 is mounted in parallel connection. When the voltage applied to the reversing input is lower than said first reference voltage value, the output from amplifier 4 goes to level "1" close to the supply voltage thereby causing switching on of the lamps associated with said control circuit. The voltage reference applied to the non reversing input is then determined by a voltage divider consisting of resistance R2 and resistance R1 to which resistance R4 is mounted in parallel connection. Such second value of the reference voltage is therefore higher than the first. Consequently, signals $I_1$, $I_2$, $I_3$ for controlling the side marker lamps and the lower and upper beam lamps respectively shift to the logic level "1" when the voltage applied through the associated photo-electric cell 5, 6 or 7 to the non reversing input to the corresponding control circuit 1, 2 or 3 becomes lower than a first threshold and again shifts to the logic level "0" when such voltage is higher than a second threshold higher than the first. The existence of both threshold reference voltages for each control circuit permits best utilization of the automatic control device for lighting of a vehicle. As a matter of fact, assuming a fixed comparison threshold, the slightest difference in luminosity (shadow, street lamps and the like) would produce continuous change in the light (for example, lower beam to upper beam and vice-versa) as soon as there would be an ambiance in which luminosity is close to that required for the lighting.

The three circuits 1, 2 and 3 differ from one another by the values of resistances R1 to R4 respectively associated thereto, the voltage threshold defined by said resistances corresponding in one case to the lighting of the side marker lamps, in a second case to the lighting of the lower beam and in a third case to the lighting of the upper beam.

The output from circuit 1, 2 and 3 therefore produces control signals $I_1$, $I_2$ and $I_3$ respectively.

Signals $I_1$, $I_2$ and $I_3$ are applied to three inputs to logic circuit 8 to control three relays 9, 10 and 11, the respective contacts 12, 13 and 14 of which respectively control the switching on of the side marker lamps 15, the lower beam 16 and the upper beam 17. As shown on FIG. 1 the marker lamps 15 are connected to the ground on the one hand, and on the other hand, to voltage $V_B$ of the battery through open contact 12 which makes when relay 9 is energized by the control circuit 8. Similarly, the lower beam 16 and upper beam 17 lamps are respectively connected between the ground and the voltage $V_B$ of the battery through contact 13 and 14 which are closed when the associated relays 10 and 11 are energized. In the totally automatic mode of operation of the device the logic control circuit 8 must enable the marker lamps 15 to be switched on as soon as the output signal $I_1$ from the control circuit 1 is at level "1", the lower beam 16 to be on when signal $I_2$ is at the logic level "1", with signal $I_3$ being at the logic level "0" and the upper beam lamps to be on when the signals $I_1$ to $I_3$ are at level "1".

In a preferential form of embodiment as shown on FIG. 1, logic circuit 8 comprises a first reversing means 18 the input to which is connected to the input of circuit 1 so as to receive signal $I_1$. Relay 9 is connected between the voltage $V_B$ of the battery and the output from reverser 18. Consequently, when signal $I_1$ is at level "0", the output from reverser 18 is positive and relay 9 is not energized. When signal $I_1$ shifts to level "1", the output from the reverser 18 is at the low level and current can flow to relay 9 thereby making the associated contact 12 and switching the marker lights 15 on.

Similarly, reverser 19 and 20 are connected between the output from circuits 2 and 3 and relays 10 and 11 respectively, such relays being moreover connected to the supply voltage $V_B$ through a terminal E the function of which will be explained hereinbelow with reference to FIG. 3.

As mentioned above, the lower and upper beams must not be switched on simultaneously. To this end the logic control circuit 8 comprises two supplementary inputs to receive signals $I_4$ and $I_5$ respectively and connected to the lower beam 16 and the upper beam 17 lamps respectively. Signal $I_4$ is applied to the input to a reverser 21 having its output connected to the input of reverser 20. Similarly, signal $I_5$ is applied to the input of a reverser 22 the output of which is connected to the input of reverser 19. Furthermore, circuit 8 comprises a reverser 23 having its input connected to the input of reverser 20 through a resistance 24 and its output connected to the input to reverser 19.

In this way, when signal $I_2$ is positive, signal $I_3$ being zero, the output from reverser 19 is at the lower level thereby energizing relay 10 and causing the lower beam lamps 16 to be on. Signal $I_4$ is then at the level "1" and through the reverser 21 brings to the level "0" the input of reverser 20 thereby preventing energization of relay 11 and hence lighting of the headlamps. The signals $I_3$ and $I_5$ being at level "0", the outputs from reversers 22 and 23 are also positive.

When signal $I_3$ becomes positive, the output from reverser 23 moves to level "0" and sets to the ground the input of reverser 19 on condition obviously that the operational amplifier of circuit 2 is dimensioned so as to be able to provide maximum current lower than the saturation current for reversers 23 and 22. Therefore, this inhibits energization of relay 10 and the switching on of the lower beam lamps. Signal $I_4$ thus shifts again to level "0" and through the reverser 21 enables relay 11 thereby permitting the lower beam 17 to go on. Simultaneously, the signal $I_5$ moves to level "1" and through reverser 22 also sets the input to reverser 19 to the ground.

Resistance 24 is required to permit the lower beam lamps to go on since if it were absent the reverser 21 would not permit the signal $I_3$ to change to level "1".

The device shown on FIG. 1 enables not only totally automatic operation as described above but also semi-manual operation.

In this operational mode the manual lever being in the extinction position has nevertheless priority over the automatic control and causes the lower or upper beam respectively to switch on when it is in the lower or upper beam lamp position on condition that the ambient illumination is lower than the threshold controlling the automatic lighting of the marker lamps.

To this end, the manual lever 25 to control the vehicle lighting is connected in parallel to the automatic device. As shown, said manual lever 25 is composed of a switch 26 on the one hand, and on the other, of a selector 27 having three positions. In the vehicles not comprising an automatic lighting device the manual lever is connected to the various lamps as represented on FIG. 1 and such an arrangement is maintained in the device according to the invention. A first terminal of the commutating switch 26 is connected to the battery voltage $V_B$, while its other terminal is connected to the common contact 27a of selector 27. Such contact 27a is connected to the side marker lamps 15. In this way, the marker lamps 15 are lighted as soon as the switch 26 is closed. Selector 27 has three contacts 27b, 27c and 27d. The contacts 27c and 27d are connected to the lower beam 16 and upper beam 17 respectively. Thus, in the normal manual mode, when switch 26 is closed, the marker lights are on and moreover, if selector 27 is in the position 27c, the lower beam lamps come on, whereas if selector 27 is in the position 27d, the upper beam lamps come on.

In the semi-manual mode, the switch 26 remains open. So long as selector 27 remains in position 27b, operation of the device is totally automatic. If selector 27 is brought manually to the position 27c corresponding to the lighting of the lower beam such lamps come on, on condition, however, that ambient illumination is lower than the threshold required for switching the marker lights, since in that case the signal $I_1$ shifts to level "1" and causes contact 12 to make, hence the marker lights to switch on. The terminal 27a of the selector connected to the marker lights is therefore connected to the power supply voltage of battery $V_B$ through contact 12 and, through contact 27c causes the lower beam 16 to come on. The signal $I_4$ then moves to level "1" and through reverser 21 prevents any lighting of the headlamps, even though signal $I_3$ would pass to level "1". Similarly, when selector 27 is in the position 27d the head lamps 17 are on and through the signal $I_5$ and reverser 22 the lighting of the lower beam is inhibited. Thus, in the semi-manual mode, manual operation has priority over the automatic operation in the lower and upper beam position, on condition that the marker lights have automatically come on.

The device according to FIG. 1 can therefore work according to three different modes:
 a manual mode with the switch 26 being closed;
 a totally automatic mode with switch 26 being open and selector 27 in the position 27b;
 a semi-manual mode in which switch 26 is open, the manual control has priority over the automatic control and controls the lower and upper beams respectively, on condition that the ambient illumination is lower than the threshold controlling the automatic switching on of the marker lights.

In case the vehicle is equipped with fog lamps these may also be connected to the automatic control device so that the switching on thereof automatically causes the lower beam to come on. For example, the fog lamps can be mounted in parallel connection to the input $I_2$ so as to shift it to level "1" as soon as the switch connecting the fog lamps to the battery voltage is closed. Simultaneously, they may be connected through a reverser to the input of reverser 20 thereby inhibiting the lighting of the upper beam.

Figure 2:
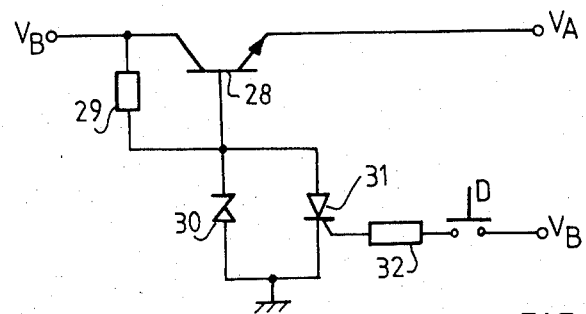
FIG. 2 shows a preferential form of embodiment of a power supply circuit for the device according to the invention.

Provision can also be made to completely inhibit automatic operation of the circuit. This can be effected, for instance, by means of the power supply circuit shown on FIG. 2 which normally supplies voltage $V_A$ to circuits 1,2 and 3 and the photo-electric cells 5, 6 and 7. Such a power supply circuit essentially consists of a transistor 28 the collector of which is connected to the battery voltage $V_B$ while its emitter is the output to which the power supply voltage $V_A$ is applied. The base of transistor 28 is connected through a resistance 29 to its collector and through a Zener diode 30 to the ground. Such circuit supplies a stabilized voltage $V_A$ in a known manner even if voltage $V_B$ varies significantly. For example, for a voltage $V_B$ of 12 V, such variations may be from $-10\%$ to $+30\%$, i.e. $V_B$ may vary from 11 to 16 V without disturbing the operation of the electronic lighting control circuit. To permit inhibition of the automatic control device for the vehicle lamps there is provided a thyristor 31 in parallel connection to the Zener diode 30. The trigger of the thyristor is connected to voltage $V_B$ of the battery through a limiting resistance 32 and a normally open push-button D. When the latter is pushed a positive voltage pulse is applied to the trigger of thyristor 31 to make it conductive, thereby to short-circuit Zener diode 30, and bring voltage $V_A$ to the ground. Circuits 1,2 and 3 and cells 5,6 and 7 are therefore no longer energized and cannot control relays 9, 10 and 11 through the logic circuit 8. Thus, the automatic operation of the device is totally inhibited and only purely manual steps are possible.

The collector of transistor 28 is preferentially connected to the battery through the ignition contact key such that the automatic operation is automatically re-established when the ignition is switched on after stopping the vehicle. As a matter of fact, as soon as the voltage applied to the collector, hence to the thyristor 31, disappears (vehicle ignition switched off), the thyristor is no longer conductive and it will be set again only when a new pulse is applied to its trigger through the push-button D. Assuming in fact that the push-button has moved on and automatic control is inhibited, when the vehicle is in its stopping condition, the voltage $V_B$ is no longer applied to thyristor 31. When the vehicle moves off, the thyristor is no longer set and the automatic control is again ready to function.

Thus, the automatic control device for the vehicle lighting is enabled through the agency of the ignition key. However, in order to prevent the battery from discharging too much when the vehicle is moving off, provision is made to prevent the upper and lower beams to come on for all the period of time required for starting the vehicle. So, when the ignition key is turned, only the side marker lights go on if darkness is sufficient and the upper or lower beams can only be switched on after the vehicle has come off.

Figure 3:
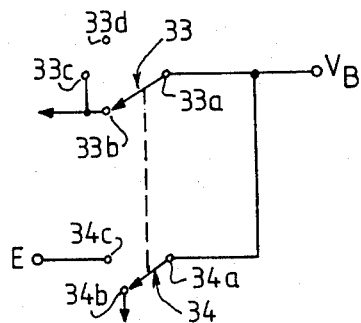
FIGS. 3 and 4 represent circuits associated with the device according to the invention to permit inhibition of the upper and lower beams when the vehicle is moving off.
Figure 4:
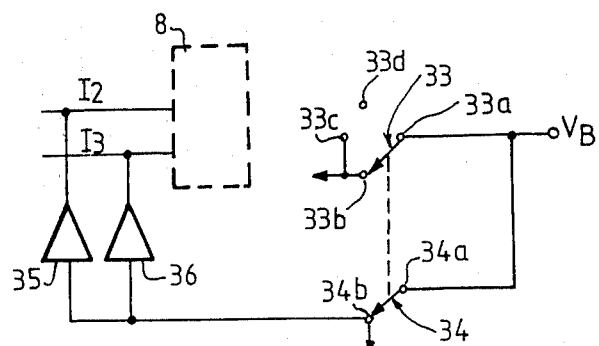

FIGS. 3 and 4 show two possible modes of realization of the invention to permit inhibition of the lower and upper beams on starting off.

On FIG. 3 there are shown two selectors 33 and 34 normally provided in all motor cars and simultaneously controlled by the ignition key. The common points 33a and 34a of these selectors are connected to the battery so as to be supplied with voltage $V_B$. Selector 33 has three positions 33b, 33c, 33d. In position 33d the vehicle is stationary. Contacts 33b and 33c are connected to one another and to the vehicle ignition coil such that the latter is energized as soon as ignition contact is made. Contact 34b is connected to the starter. When selector 33 is in the position 33b, selector 34 is in the corresponding position 34b in which voltage $V_B$ is applied to the starter. Selector 34 has a contact 34c which is connected to point E shown on FIG. 1. Therefore, relays 10 and 11 are only energized when selector 34 is in the position 34c and not upon starting off, since the selector is then in the position 34d.

In case such contact 34c would not be provided in the vehicle, the desired inhibition on starting off would however, be possible, for example, by using the mode of realization of FIG. 4. In this case, terminal E of the relays is directly connected to the voltage $V_B$ of the battery but contact 34b of selector 34 which is connected to the starter is applied to the input of two reversers 35 and 36 having outputs respectively connected to the outputs from circuits 2 and 3. In that case, on starting off the input of reversers 35 and 36 being positive, these drive to the ground the input to the circuit 8 to which signals $I_2$ and $I_3$ are applied to thereby prevent any lighting of the lower and upper beams.

It has been mentioned above that the three control circuits 1, 2 and 3 are identical but that only circuit 1 is shown, on FIG. 1.

Reference will now be made to FIG. 5 which shows on a larger scale the control circuit 3. To avoid excessive overload of the drawing the constitutive elements of the logic control circuit 8 have not been shown; only the input signals $I_1, I_2, I_3, I_4$ and $I_5$ as well as the output signals to the relays 9, 10 and 11 have been schematized.

It is to be noted that each control circuit 1, 2, 3 and more particularly, control circuit 3 comprises an operational amplifier 4 the reversing input − of which is connected to the associated photo-sensitive element, 7 in the occurrence, and the non reversing input + of which is connected to a reference voltage having two different values, depending on the output voltage from amplifier 4. To this end, such non reversing input to the amplifier 4 is connected to the supply voltage $V_A$ through a first resistance R1, to the ground through a second resistance R2 and to the output from amplifier 4 by a third resistance R4.

When the device is in the position of totally automatical operation, each control circuit 1, 2, 3 and more particularly, circuits 2 and 3 produce a signal for switching on the corresponding headlamps when luminosity is lower than a first threshold and an extinction signal when luminosity increases above a second threshold higher than the first.

Experience shows that if a vehicle provided with such a control device, in a totally automatic operation and upper beam lighting position, meets extraneous light source generated for example by illuminated windows, white walls, guiding rails in curves, retro-reflectors, reflecting panels, and the like, the light from the vehicle headlamps will reflect from the reflective systems and the photosensitive element 7 will interpret such sudden increase in luminosity as being the passing of another vehicle and cause extinction of the headlamps and the switching on of the crossing or lower beam lamps.

Soon upon extinction of the headlamps, light is no longer reflected and the system initializes extinction of the lower beam and the lighting of the headlamps, resulting in an untimely flashing embarrassing to the driver during the period of time when the vehicle is under such circulation conditions.

It is to be noted that such phenomenon does not occur with the side lights due to the low power of the emitted light and that it is significant with the lower beam lamps because of the important value of electric hysteresis between both thresholds corresponding to the lighting and extinction of said lower beam lamps.

With the upper beam lamps, such phenomenon is emphasized and tiresome. It mainly occurs in the curves on narrow roads having reflective obstacles such as protective rails, high white walls, retro-reflectors, and the like, or even on highways in the presence of reflective panels of very large dimensions.

The reflective light control device combined with the upper beam control device 3 according to the present invention permits total elimination of such untimely flashing phenomenon.

FIG. 5 shows on a larger scale the upper beam control circuit 3, similar to the circuit previously described in connection with FIG. 1. Since it works strictly in the same way, it will not be described again.

It will now be seen how it is possible to make such automatic device insensitive to the above-mentioned flash phenomenon which is due to reflection of light produced by the vehicle's own headlamps and would be interpreted by the photo-sensitive cell as being a light source from another vehicle, or as being a significant illumination source on the road, by adjoining thereto a reflective light monitoring system.

Generally, the reflective light monitoring system according to the invention consists of two basic elements, namely,:

(a) a radiation transmitter, preferably producing invisible such as infra-red radiations which are time modulated;

(b) a receiver, only responsive to radiations from the transmitter.

According to another characteristic of the invention, the transmitter is of the directive type and mounted on the vehicle so as to substantially cover the same entrance angle as the vehicle headlamps, while the receiver is mounted in the vehicle so as to be in the shadow of the transmitter, i.e. there is no direct optical contact between transmitter and receiver.

In this way, the receiver only responds to the quantity of the radiations from the transmitter reflected by obstacles encountered as the vehicle moves on the road.

Obviously, the receiving circuit is designed so as to be only sensitive to radiations from its own transmitter, such that if another motor car equipped with a similar system is encountered, radiations from both vehicles should not interfere with one another.

In view of the above, it can be seen that the receiver output will supply a voltage which may be:

either proportional to the quantity of reflected radiations or present only when the quantity of reflected radiations is above a predetermined value.

We now refer to FIG. 5 on which an infra-red radiation transmitter 37 and a receiver 38 associated therewith are schematized.

As an exemplifying form of embodiment, there have also been schematized an amplitude and frequency modulated radiation transmission $37_A$, and the quantity $38_A$ of a radiation reflected from any obstacle 39 and picked up by receiver 38.

The output of receiver 38 supplies a voltage which as mentioned above is either proportional to the quantity of radiations reflected or present when the quantity of radiations reflected is higher than a predetermined value.

In accordance with the invention, it is possible to act upon the automatic lighting system in two different ways.

More specifically, when the voltage is proportional to the quantity of reflected radiations, by acting on the comparator 4 voltage, the required quantity of light to switch off the headlamps can be gradually increased.

With the voltage being higher than a predetermined value system, headlamp extinction thresholds may be instantaneously changed in the presence of reflective obstacles.

In accordance with the invention, the reference voltage of comparator 4 is acted upon by applying the voltage possibly transmitted from the receiver to the terminal VR of a resistance R5 connected to the non reversing input + of amplifier 4 through a diode 40.

It can easily be seen that a positive voltage from the terminal VR of resistance R5 passing through diode 40 can vary the reference voltage of comparator 4 which determines the headlamp lighting and extinction threshold.

Since the receiver circuit 38 works only when the headlamps are lit this practically results in the comparator 4 voltage varying only for the extinction. It is to be noted actually that the threshold voltage determining the lighting is not affected by the voltage deficiency in VR.

The transmitter 37 and the receiver 38 are synchronized by any known means such that radiations coming to the receiver in a time other than during the operation of the transmitter are interpreted as issued from another source than the transmitter so that they cause inhibition of the signal which otherwise would vary the automatic control extinction threshold.

FIG. 5 shows a circuit insensitive to other transmitters and comprising a comparator 41 intended for preventing the reflected radiations indicator from working when it picks up transmission from other cars. To this end, the signal picked up by the receiver 38 is applied to the input 42 to the comparator while the signal from the transmitter 37 is applied to the input 43 of said comparator.

Examination of the drawings reveals that if the voltage becomes positive at the input 43 of the comparator in a period of time equal to that for which the voltage applied to the input 42 becomes positive at the output 44 from the comparator, it will remain positive and the monitoring system will be able to operate.

If on the other hand, the voltage at the input 43 becomes positive in a period of time for which the voltage applied to the input 42 is not positive, the comparator output 44 becomes low (ground potential) thereby resulting in voltage VR being derived to the ground through a diode 45, and consequently, preventing it from having an effect on the reference voltage from comparator 4 of the automatic lighting and extinction unit.

Since probability, for two cars passing one another, to transmit their modulated radiations at the same frequency and if so, with the same phase is practically inexistent, the safety range of the monitoring system according to the invention has virtually no limits.

Moreover, it is important to note that as infra-red radiations pierce fog such system can be used with anti-fog headlamps. The receiver in this case may be connected through a simple contact to an acoustic, visual or optical alarm device having the advantage of warning the driver when the vehicle moves close to an obstacle such as another vehicle thereby increasing safety to a great extent.

Such an alarm system can obviously be maintained in normal operation to prevent lack of concentration of the driver.

It will be understood that various modifications of the device described and represented can be made without departing from the scope of the invention as defined in the appended claims.

We claim:

1. An automatic control system for the lighting and extinction of the headlamps in an automotive vehicle of the type comprising at least two photo-sensitive elements, respectively connected to two control circuits to define luminosity thresholds and to produce control signals as a function of the ambient luminosity, as well as a logic control circuit having inputs receiving at least said control signals and outputs connected at least to the lower and upper beam lamps, and comprising moreover:

a third photo-sensitive element connected to a third control circuit;

said third control circuit defining at least one luminosity threshold and producing, as a function of the ambient luminosity, a control signal acting through the intermediary of said logic control circuit upon the side marker lights of the automotive vehicle;

said logic control circuit being provided with a first, second and third inputs, to which said control signals are respectively applied as well as a first, second and a third outputs;

said outputs being connected to said marker lights, lower and upper beam lamps respectively, through the intermediary of three relays;

said three relays have normally open contacts and connect said side marker lights, lower and upper beam lamps respectively to the battery of the automotive vehicle;

a manual control means to which the control device is connected in parallel connection, such manual control means consisting of a switch mounted in a series connection with the vehicle battery and of a three position selector, the common point of said switch with said selector being connected to the side marker lights, and the first, second and third positions of said selector being connected to the side marker lights and the lower and upper beam lamps respectively;

whereby totally automatic operation is obtained when said switch is open and said selector is in its first position; manual operation is obtained when said switch is closed; and a semi-manual operation is obtained when said switch is open and said selector is in the second or third position.

2. A system as claimed in claim 1, wherein each control circuit comprises an operational amplifier having a reversing input connected to the associated photo-sensitive element and a non reversing input connected to a reference voltage having two different values as a function of the amplifier output voltage to produce a signal for switching on the corresponding lamps when luminosity decreases to under a first threshold and an extinction signal when luminosity increases above a second threshold higher than the first.

3. A system as claimed in claim 2, wherein in each control circuit the non reversing input of the operational amplifier is connected to the supply voltage through a first resistance, to the ground through a second resistance and to the output from the amplifier through a third resistance.

4. A system as claimed in claim 3, wherein the logic control circuit comprises a fourth input connected to the lower beam lamps and to the corresponding position of a manual lever, and a fifth input connected to the upper beam lamps and to the corresponding position of said manual lever, a signal applied to the fourth input having priority over a signal applied to the third input connected to the control circuit for the upper beam lamps and a signal applied to the fifth input having priority over a signal applied to the second input connected to the control signal for the lower beam lamps.

5. A system as claimed in claim 4, wherein the control circuit comprises a first reverser connecting its first input to the control relay for the side marker lights, a second reverser connecting its second input to the control relay for the lower beam lamps, a third reverser connecting its second input to the control relay for the upper beam lamps, a fourth reverser connecting its fourth input to the input of the third reverser, a fifth reverser connecting its fifth input to the input of the second reverser, and a sixth reverser connecting its second and third inputs, with a resistance being disposed between its third input and the input of the third reverser.

6. A system as claimed in claim 5, wherein the automatic upper beam control circuit is combined with a reflected light monitoring system comprising: a transmitter producing radiations, preferentially, invisible, such as infra-red, radiations, which are modulated; and a receiver only responsive to radiations from the transmitter which are reflected from obstacles encountered as the vehicle moves on, said receiver being designed to supply a signal as a function of the quantity of reflected radiations, said signal being applied through a resistance-diode input to the control device so as to vary, so long as said signal is positive, the reference voltage of the comparator which determines the thresholds for lighting and extinction of the upper beam lamps whereby the untimely upper beam flashing phenomenon due to reflection of light generated by the vehicle's own headlamps is totally eliminated.

7. A system as claimed in claim 6, wherein the signal picked up by the receiver is applied to an input to a comparator having another input receiving the signal from the transmitter, the output from said comparator supplying a positive output signal if the signals applied to the comparator inputs are identical in timed relationship and a negative output signal if the input signals are not identical in timed relationship, said output signal being applied through the intermediary of a diode upstream of the said resistance-diode whereby the reflected light monitoring system works only if reflected light comes from its own transmitter.

8. A system as claimed in claim 7, wherein the transmitter is of the directive type and is mounted on the vehicle so as to substantially cover the same entrance angle as the vehicle upper beam headlamps, whereas the receiver is positioned on the vehicle so as not to receive direct radiations from the transmitter.

9. A system as claimed in claim 8, wherein the light monitoring system is connected through an appropriate contact to an acoustic, visual or optical device operable simultaneously with said light monitoring system thereby increasing the safety range, more particularly, in case of foggy weather.

10. A system as claimed in claim 5, wherein it comprises a power supply circuit having an output connected to the ground so long as the ignition key of the vehicle has not been actuated, said power supply circuit comprising a thyristor having a trigger connected to the battery through a normally open push-button and being connected so as to derive the power supply voltage to the ground when it is unset.

* * * * *